United States Patent [19]
Willkie et al.

[11] Patent Number: 5,923,705
[45] Date of Patent: Jul. 13, 1999

[54] UART BASED AUTOBAUDING WITHOUT DATA LOSS

[75] Inventors: James J. Willkie, Poway; James A. Hutchison, IV, San Diego, both of Calif.

[73] Assignee: QUALCOMM Incorporated, San Diego, Calif.

[21] Appl. No.: 08/684,346

[22] Filed: Jul. 18, 1996

[51] Int. Cl.[6] ............................. H04B 1/38; H04L 5/16
[52] U.S. Cl. .................... 375/220; 375/219; 375/222; 455/422; 455/403
[58] Field of Search ................................. 375/219, 220, 375/222, 225; 455/422, 550

[56] References Cited

U.S. PATENT DOCUMENTS

| | | | |
|---|---|---|---|
| Re. 34,034 | 8/1992 | O'Sullivan ........................... | 379/59 |
| 4,658,096 | 4/1987 | West, Jr. et al. ..................... | 379/59 |
| 4,697,281 | 9/1987 | O'Sullivan ........................... | 379/59 |
| 4,718,082 | 1/1988 | Parker et al. ........................ | 379/98 |
| 4,737,975 | 4/1988 | Shafer ................................. | 379/58 |
| 4,775,997 | 10/1988 | West, Jr. et al. ..................... | 379/58 |
| 4,829,554 | 5/1989 | Barnes et al. ........................ | 379/58 |
| 4,868,863 | 9/1989 | Hartley et al. ....................... | 379/98 |
| 4,922,517 | 5/1990 | West, Jr. et al. ..................... | 379/58 |
| 4,972,457 | 11/1990 | O'Sullivan ........................... | 379/59 |
| 5,119,397 | 6/1992 | Dahlin et al. ........................ | 375/5 |
| 5,127,041 | 6/1992 | O'Sullivan ........................... | 379/59 |
| 5,249,218 | 9/1993 | Sainton ............................... | 379/59 |
| 5,257,397 | 10/1993 | Barzegar et al. ..................... | 455/33.1 |
| 5,265,119 | 11/1993 | Gilhousen et al. ................... | 375/1 |
| 5,359,626 | 10/1994 | Kloker et al. ........................ | 375/7 |
| 5,367,563 | 11/1994 | Sainton ............................... | 379/98 |
| 5,408,520 | 4/1995 | Clark et al. .......................... | 379/93 |
| 5,416,829 | 5/1995 | Umemoto ............................ | 379/58 |
| 5,428,664 | 6/1995 | Kobayashi .......................... | 379/58 |
| 5,428,671 | 6/1995 | Dykes et al. ........................ | 379/93 |
| 5,604,870 | 2/1997 | Moss et al. .......................... | 395/280 |
| 5,631,952 | 5/1997 | O'Barr et al. ........................ | 379/93 |
| 5,654,983 | 8/1997 | Sauser, Jr. ............................ | 375/225 |
| 5,680,324 | 10/1997 | Schweitzer, III et al. ............. | 364/514 |
| 5,711,012 | 1/1998 | Bottoms et al. ...................... | 455/557 |
| 5,752,199 | 5/1998 | Scott ................................... | 455/557 |

*Primary Examiner*—Stephen Chin
*Assistant Examiner*—Mohammad Ghayour
*Attorney, Agent, or Firm*—Russell B. Miller; Charles D. Brown; Brian S. Edmonston

[57] ABSTRACT

The cellular telephone includes a universal asynchronous receive and transmit (UART) chip for receiving data in a serial format from an external source, such as a laptop computer, and for converting the serial data to parallel bytes of data for transmission to a microcontroller of the cellular telephone. The UART operates in one of two modes: a sample mode and a byte mode. In the sample mode, voltage levels of serial data signals received by the UART are detected and sample bytes are generated representative of those voltage levels. The sample bytes are stored within a receive First In First Out (FIFO) queue of the UART for eventual transference to the microcontroller. The microcontroller converts the sample bytes to signals appropriate for transmission using a cellular transmission format such as code division multiple access (CDMA). In the byte mode, the UART receives data bytes as bytes and stores those bytes directly within the receive FIFO without any sampling. The data bytes stored within the receive FIFO are transferred to the microcontroller which converts the bytes to appropriate signals for transmission from the cellular telephone. By processing input data as bytes rather than as samples, the microcontroller consumes far fewer resources processing the data thereby achieving, among other advantages, overall power reduction. In use, the UART is controlled to initially receive data as samples. The microcontroller examines the samples to determine the baud rate of received data then controls the UART to switch to the byte processing mode using the detected baud rate. Techniques for determining the baud rate and for switching the UART to byte mode without loss of data are also described herein.

14 Claims, 12 Drawing Sheets

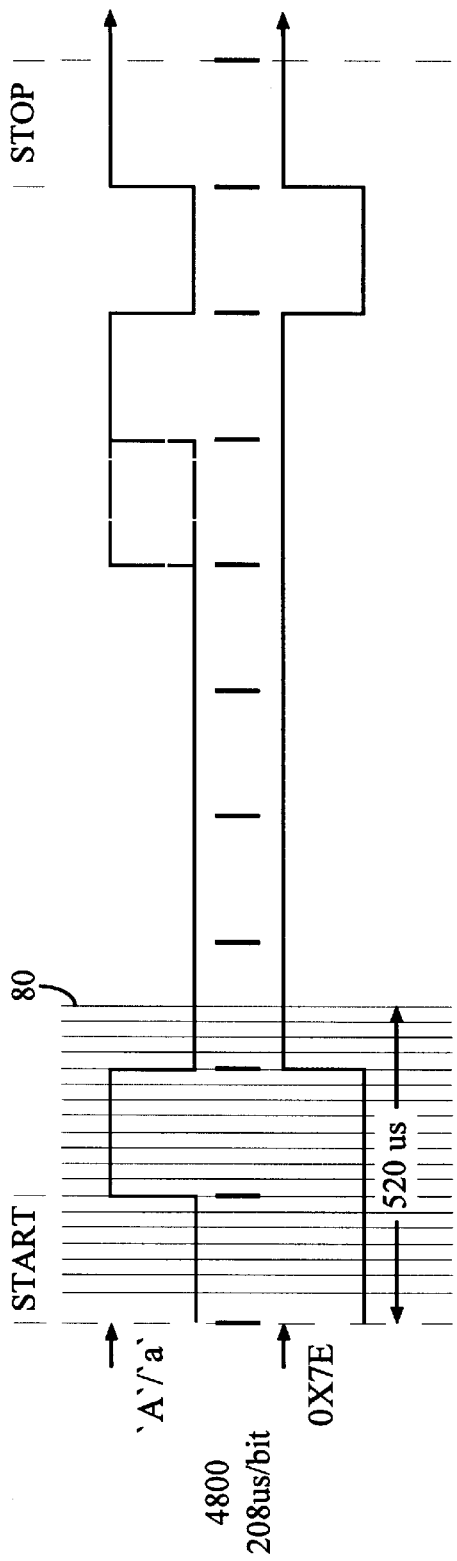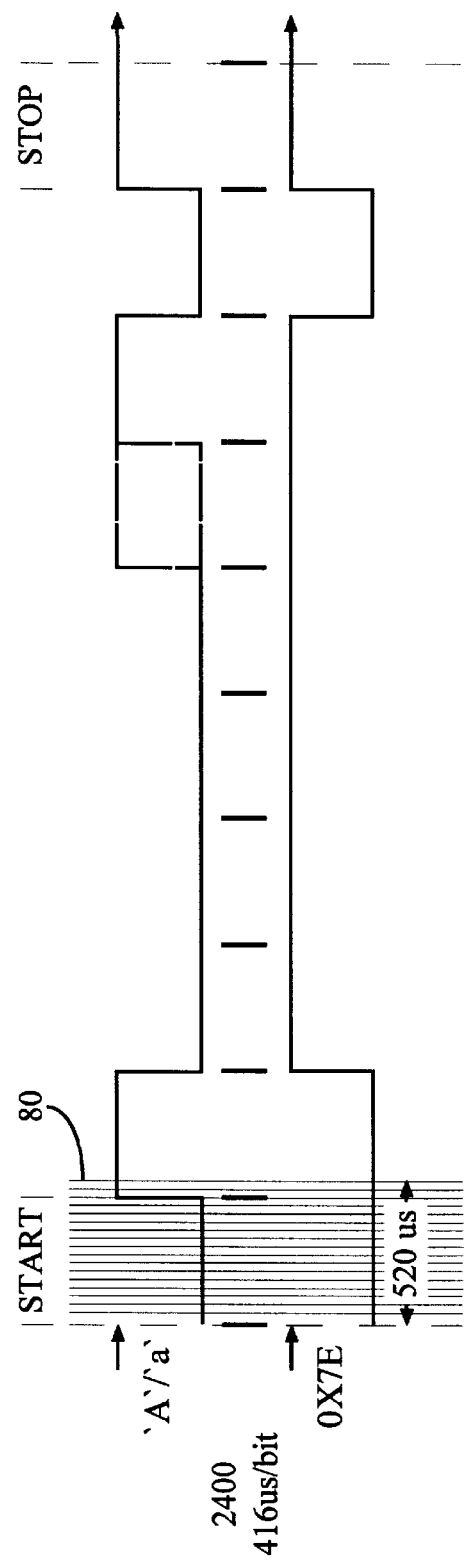

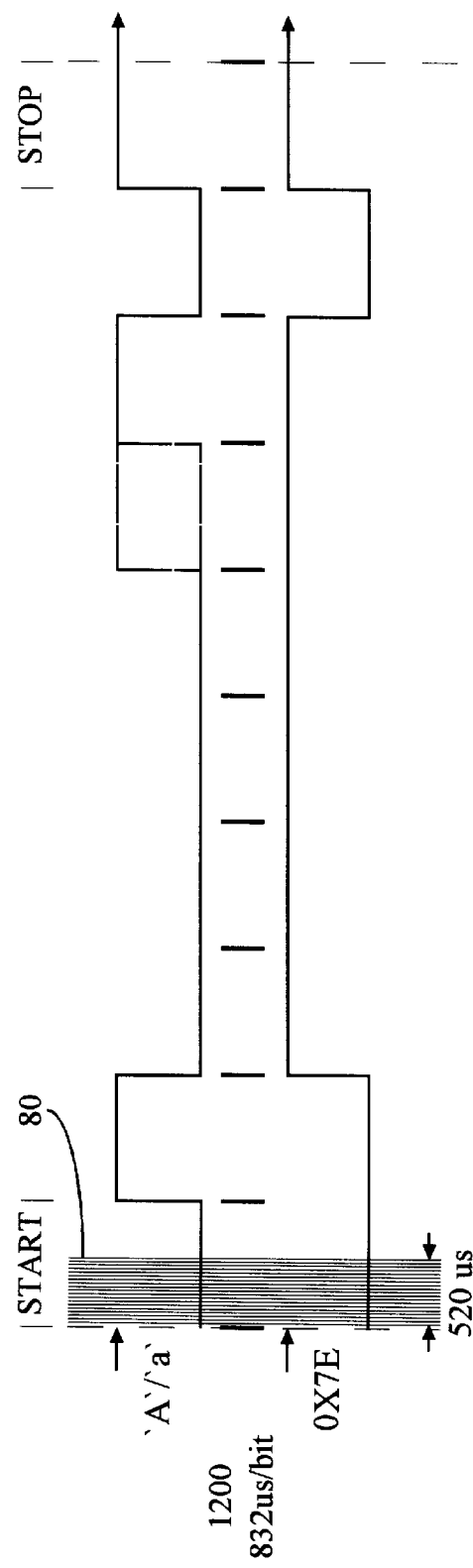

UART BASED AUTOBAUDING WITHOUT DATA LOSS

BACKGROUND OF THE INVENTION

I. Field of the Invention

The invention generally relates to cellular telephones and in particular to cellular telephones configured for receiving and transmitting data.

II. Description of the Related Art

Cellular telephones are becoming increasingly popular as an alternative medium for telephonic communication beyond conventional land lines such as the public switched telephone network (PSTN). Initially, cellular telephones were only provided with voice transmission capabilities for transmitting voice conversations. More recently, it has become desirable to also provide cellular telephones with the capability to receive and transmit data, such as data provided by a laptop computer or portable facsimile machine. For example, with a cellular telephone configured to receive and transmit data, a user may transmit data from a laptop computer to a base computer, perhaps at the home or office. Alternatively, the user can access the Internet using a laptop computer, perhaps to browse web pages or to access message boards. With such an arrangement, the user can also access E-mail remotely using the laptop computer and cellular telephone.

To provide data services, the data provided by the laptop computer or other data source must be converted into signals appropriate for processing and transmission by the cellular telephone. For a cellular telephone configured to process and transmit signals in accordance with the American Mobile Phone System (AMPS) protocols, the data must be converted to analog signals representative of tones of the type typically transmitted over land lines connected to the PSTN. For telephones configured in accordance with time division multiple access (TDMA) or code division multiple access (CDMA) transmission protocols, the received data must be converted to data formats appropriate for those protocols. Difficulties arise performing such conversions, particularly insofar as baud rate detection is concerned and insofar as power consumption is concerned To efficiently process data, the baud rate at which the data is transmitted to the cellular telephone must first be determined. Without knowing the baud rate, the cellular telephone cannot effectively decode the received data for the purposes of converting the data to the appropriate format for transmission. This is particularly true for cellular telephones incorporating TDMA or CDMA. Baud rate detection should be performed in a manner such that there is no loss of data which could otherwise result in corruption of the data requiring complete re-transmission of some portion of the data. The baud rate may change dynamically during a data transmission perhaps in response to the detection of amounts of noise within the overall signal transmission system. Switching of baud rates during transmissions also occurs routinely during facsimile transmissions. Accordingly, to provide data transmission services, the cellular telephone should be capable of detecting and responding to changes in baud rate without loss of data.

One possible solution is to include a digital signal processing (DSP) chip within the cellular telephone. The DSP receives formatted signals directly from the laptop computer or other data source and determines therefrom the baud rate of the data. In the case of an AMPS cellular telephone, the DSP chip would then convert the data, in accordance with the determined baud rate, into the aforementioned tone signals for transmission to other components of the cellular telephone, such as to a microcontroller, for further processing and eventual transmission. In the case of a TDMA or CDMA cellular telephone, the DSP chip would instead convert the data, in accordance with the determined baud rate, into the appropriate data format for transmission using TDMA or CDMA transmission protocols.

Various DSP chips are available which are capable of detecting the baud rate of data and are capable of converting the data to signals appropriate for processing by the microcontroller of a cellular telephone without any loss of data. However, such DSPs are fairly expensive and consume significant amounts of power. As such, a cellular telephone incorporating such a DSP will likely be rather expensive and may have a fairly minimal power life. To minimize the cost of the cellular telephone itself and to minimize power consumption within the cellular telephone, it has been proposed to provide the DSP chip within a Personal Computer Memory Card International Association (PCMCIA) card for insertion into the laptop computer or other device. As such, the DSP draws its power from the laptop computer and not from the cellular telephone. Moreover, the cellular telephone can be sold without a DSP thereby reducing costs of the cellular telephone itself. Although such an arrangement represents an effective solution for some purposes, problems remain. In particular, to obtain a telephone capable of performing data transmission, a user must purchase not only the telephone but the separate PCMCIA card including the DSP chip resulting in a total cost which likely exceeds the cost of purchasing a cellular telephone incorporating a DSP chip. Moreover, not all laptop computers, and other data source devices, are provided with PCMCIA card slots for accommodating PCMCIA cards.

Accordingly, it would be desirable to provide an improved method and apparatus for implementing data transmission services within a cellular telephone which does not require use of a DSP chip whatsoever and which does not require interconnection via a PCMCIA card.

SUMMARY OF THE INVENTION

In accordance with one aspect of the invention, a method and apparatus for perfroming autobauding via the use of a universal asynchronous receive and transmit (UART) is described. A UART is a widely available system which consumes substantially less power than a DSP, and is substantially less costly. In one embodiment of the invention, the UART is configured to process input data received along the serial line as samples or, if the data format and baud rate are known, as bytes. In use, the UART is first controlled to sample input data received from the serial port and generate sample bytes having values representative of the samples. A microcontroller examines the sample bytes and determines the baud rate of the input data received through a serial port. Once the baud rate is determined, the UART is then controlled to terminate sampling of the input data and to instead process the input data as bytes in accordance with the determined baud rate. In other words, the UART is switched from a sample processing mode to a byte processing mode. By "byte processing mode", it is meant that the UART generates output bytes for transmission to the microcontroller. Depending upon the implementation, the input data to the UART may be in the form of frames, perhaps containing ten bits each, rather than in bytes. For such implementations, the UART may alternatively be referred to as being in a "character" processing mode. For generality, in the following descriptions, the term "byte" processing mode will be employed, regardless of the format of the input data.

After the UART is switched to the byte processing mode, signals received by the microcontroller from the UART are in the form of bytes of input data rather than in bytes of sample data. Hence, the microcontroller can more efficiently process the input data. Indeed, depending upon the data format and baud rate, one byte of input data may correspond to hundreds of sample bytes of input data. Thus, far fewer computational resources are required by the microcontroller to process the input data as bytes than as samples. This has numerous advantages, particularly insofar as power consumption is concerned. By performing fewer calculations during byte processing mode, the total amount of current drawn by the microprocessor will likely be reduced. Furthermore, depending upon the implementation, it may be possible to switch the microcontroller to a slower clock rate to conserve even greater amounts of power. Additionally, the use of a UART rather than DSP provides additional power savings because UARTs generally consume far less power, and operate at far lower clock rates, than DSPs. Cost savings are gained as well. UARTs are typically far less expensive than DSPs. Additionally, no external PCMCIA card, or similar interconnection device, is required. Indeed, to interconnect the cellular telephone of the invention with a laptop computer may require only an inexpensive serial connection line. Hence, savings in cost and in power consumption are gained.

As noted, in use, the UART processes data as samples until the baud rate for the data can be determined. In accordance with another aspect of the invention, a method for detecting the baud rate of an input data stream based upon samples of the data is provided. The method is as follows. Initially, the starting byte for a command sequence is identified. Then, the starting byte is sampled and the number of samples within selected portions of the starting byte are counted. If the baud rate is a higher rate, the number of samples counted within the selected portions of the starting byte will be fairly small. If the baud rate is slow, the number of samples counted within the selected portions of the starting byte will be much higher. The baud rate is calculated from a comparison of the number of samples found in the selected portions of the starting byte with predetermined numbers of samples expected to be found within the selected portions of the bytes for each of various acceptable baud rates. In one embodiment, a table is maintained which stores the number of samples expected to be found within the selected portions of the starting byte for each of the acceptable baud rates. The number of samples actually found are compared against the values of the table to determine the baud rate. In one specific embodiment, the data is transmitted in accordance with the Electronic Industry of America (EIA)/Telephonic Industry of America (TIA)-RS-232E protocol at baud rates between 1200 bps and 38.4 kilo-bps, inclusive. With this protocol, the selected portions of the starting byte for which samples are counted include a second space and a second mark within the byte if the byte corresponds to an "a" or an "A", or includes only a first mark if the byte corresponds to a 0x7E flag byte.

Once the baud rate is determined, the UART is switched to a byte processing mode only if the UART is currently receiving and processing samples corresponding to a stop bit and only if the receive First In First Out (FIFO) queue of the UART is sufficiently empty. If these conditions are not met, then the UART continues to process data as samples until the two conditions are met. For the protocol set forth above, baud rate detection is redetermined for each new command sequence. By performing baud rate detection via the use of a UART as described herein, a cellular telephone can provide wireless data network service at a reduced cost and with reduced power consumption.

BRIEF DESCRIPTION OF THE DRAWINGS

FIGS. 4A–4E are timing diagrams for the starting bytes of FIG. 3 for each of five different baud rates;

DETAILED DESCRIPTION OF THE INVENTION

With reference to the figures, exemplary embodiments of the invention will now be described. The exemplary embodiments are described primarily with reference to block diagrams and flowcharts. As to the flowcharts, each block within the flowchart represents both a method step and an apparatus element for performing the method step. Herein, the apparatus element may be referred to as a means for, an element for, or a unit for performing the method step. As to the block diagrams, it should be appreciated that not all components necessary for complete implementation of a practical system are always illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
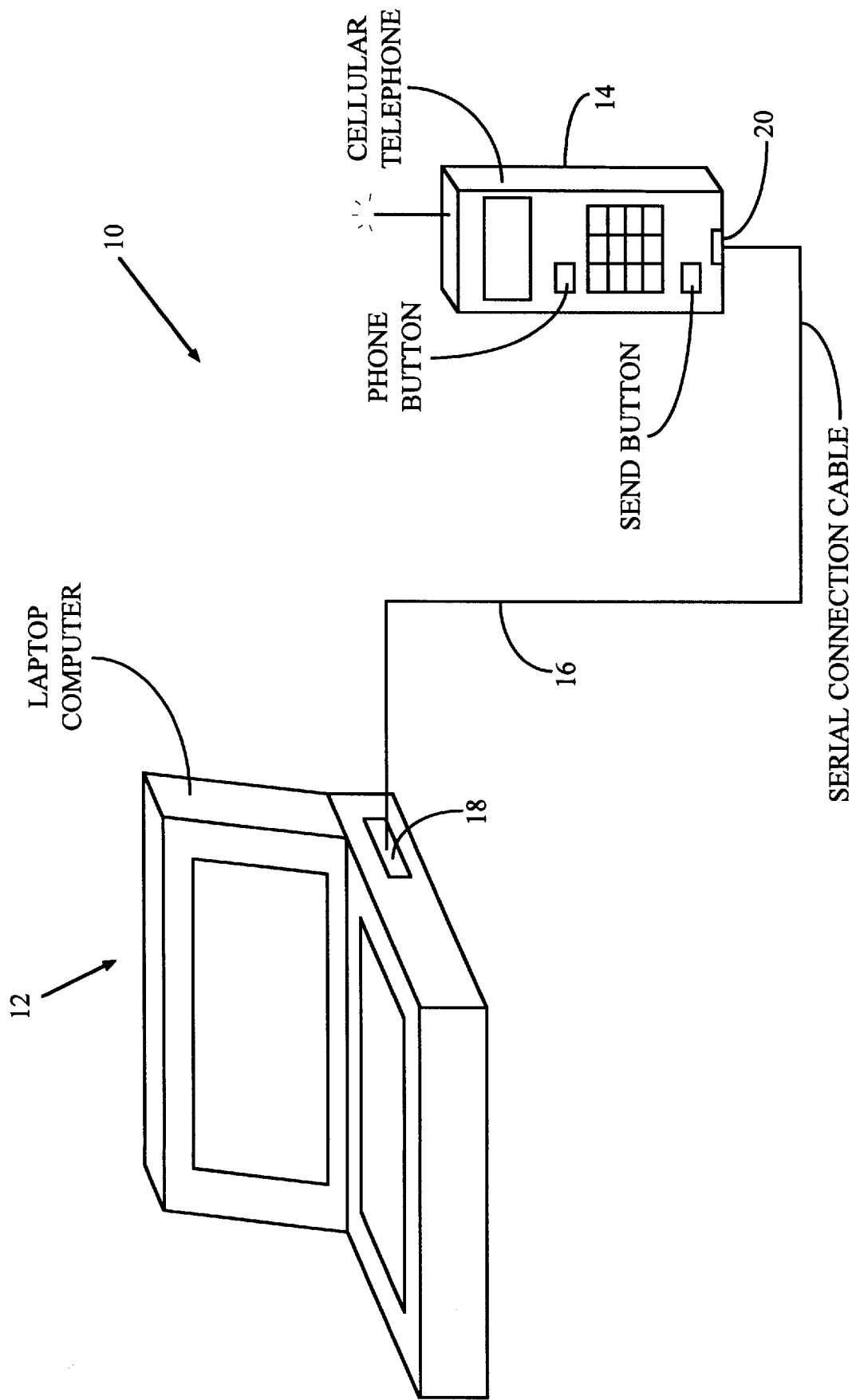
FIG. 1 is a block diagram of a cellular telephone and laptop computer with the cellular telephone configured in accordance with an exemplary embodiment of the invention.

FIG. 1 illustrates a system 10 having a laptop computer 12 and cellular telephone 14 interconnected by a serial connection line 16 interconnected through respective serial ports 18 and 20. Data signals generated by laptop computer 12 are transmitted to cellular telephone 14 over serial connection line 16 for cellular transmission to a remote cellular base station (not shown). The signals received by the base station are ultimately transmitted to a remote computer (also not shown) which, for example, may form part of the Internet. Responsive signals generated by the remote computer are ultimately transmitted by the base station and received by cellular telephone 14, then routed along serial line 16 to laptop computer 12. In the exemplary embodiment described herein, cellular transmission is performed using CDMA protocols, but other protocols may alternatively be employed in other embodiments. Serial transmission of data signals over line 16 is performed using the EIA/TIA-RS-232E interface protocol, but again alternative protocols may be employed in other implementations. The EIA/TIA-RS-232E may be found in a document entitled "ANSI/TIA/EIA-602-1992," dated June, 1992, and provided by the Telecommunications Industry Association. Also, although a laptop computer is shown in the drawings, it should be understood that any type of data source may be employed including any type of portable or non-portable computer as well as other data sources such as personal data assistants, facsimile machines, etc.

Figure 2:
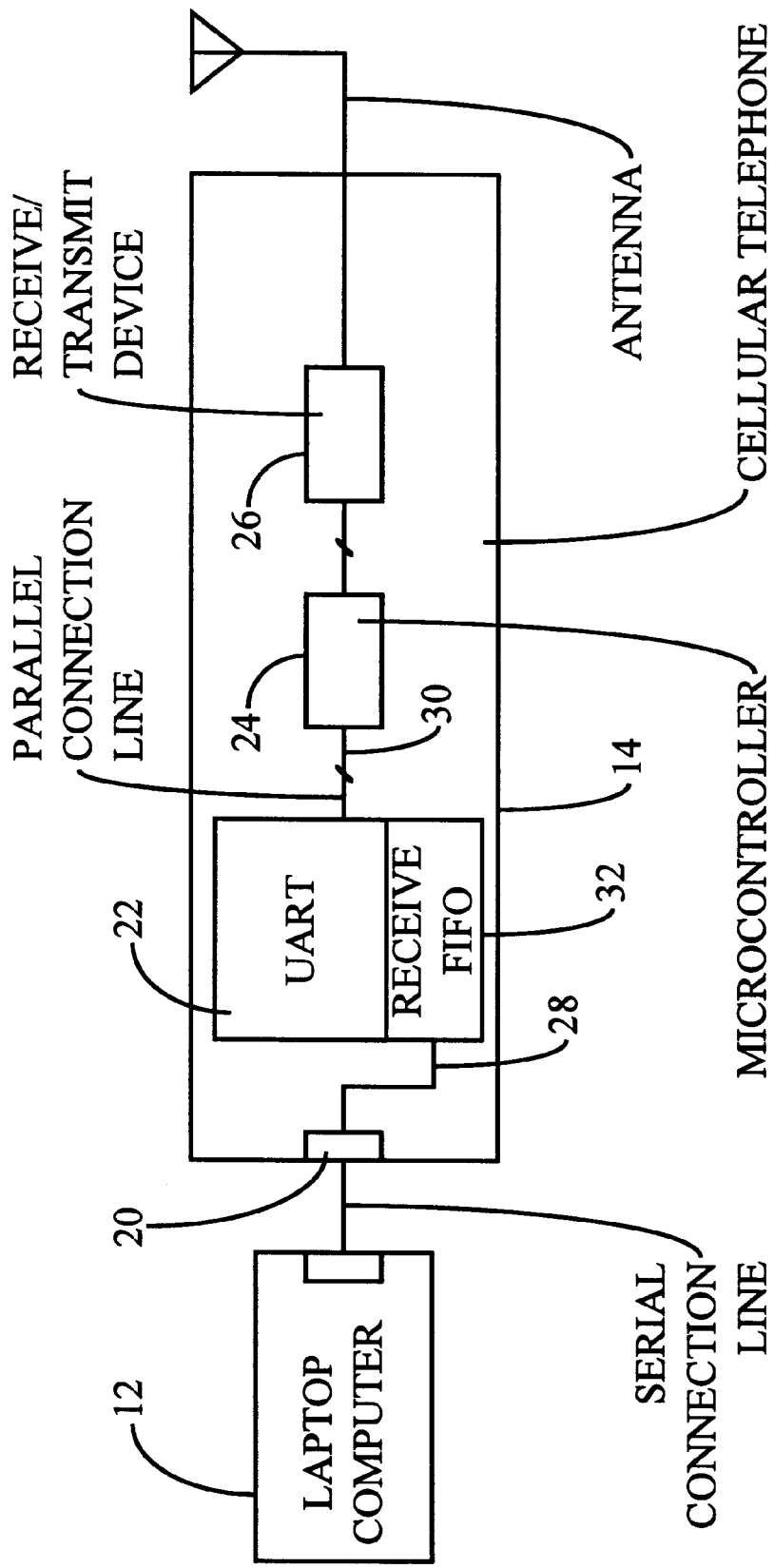
FIG. 2 is a block diagram illustrating pertinent components of the cellular telephone of FIG. 1.

FIG. 2 illustrates pertinent internal components of cellular telephone including a UART 22, a microcontroller 24, a receive and transmit unit 26 and the aforementioned serial port 20. UART 22 is connected to the serial port by a serial line 28 and is connected to the microcontroller by a parallel transmission line 30. In use, data signals are received in series along line 28 and are converted by UART 22 into parallel signals for transmission to the microcontroller over parallel line 30, and vice versa. To facilitate processing of the data, UART includes two FIFOs of which only one, a receive FIFO 32, is shown. Parallel data signals received by the microcontroller from the UART are converted to an appropriate data format for transmission using CDMA protocols and are forwarded to receive and transmit unit 26 for transmission therefrom to the local base station (not shown). In the exemplary embodiment, UART 22 is a QUALCOMM Incorporated MSM2 UART available from QUALCOMM Incorporated, the assignee of rights to the present application, and the microcontroller is a 186 microcontroller also available from QUALCOMM Incorporated.

As will be described more fully below, UART 22 is configured to operate in one of two modes: a sample mode and a byte mode. In the sample mode, input signals received along serial line 28 are sampled at a rate of, for example, one sample every 26 microseconds. By "sampled" it is meant that the voltage level along the input serial line is detected and a sample byte is generated that is representative of the relative voltage level. In the exemplary embodiment, the UART operates within a voltage range of 0 to 3.3 volts. Hence, a sample byte of 00000000 is representative of 0 volts and a sampled byte of 11111111 is representative of 3.3 volts. Any voltage signals detected therebetween are scaled appropriately. (As to the voltage range, it should be noted that RS232 signals are typically represented using a voltage range of −12 to +12 volts. Accordingly, if signals having such a voltage range are output from the laptop computer, then a voltage converter should be provided along the serial connection line between the laptop computer and the UART for converting the signal voltages to a range acceptable by the UART.)

The sample bytes, once generated by the UART, are stored within receive FIFO 32 for eventual transference to microcontroller 24. In accordance with conventional UART techniques, the data stored within the receive FIFO remains there until the microcontroller retrieves the data. If the receive FIFO begins to become sufficiently full, an interrupt signal is generated to the microcontroller indicative thereof and the microcontroller responds by retrieving all or a portion of the data. The data is transmitted from the receive FIFO to the microcontroller over parallel line 30 which, for sample bytes represented by 8 bits, may be an 8-line bus.

Thus, in the sample mode, the microcontroller receives sample bytes which collectively represent the wave form of the received signal. Microcontroller 24 processes the sample bytes, perhaps by converting to CDMA format, and forwards the sample bytes to unit 26 for eventual transmission.

In byte mode, the UART detects data bytes within the input signal received along serial line 28 and stores the bytes directly within receive FIFO for eventual transference to microcontroller 24. As such, one byte of input data is represented by one byte within the receive FIFO. This is in contrast with the sample mode wherein one byte of input data may be represented by hundreds of sampled bytes within the receive FIFO. Hence, in byte mode, the microcontroller receives only one byte over line 30 for each input data byte received in series by the UART over line 28, instead of tens or hundreds of sample bytes for each input data byte. Accordingly, the microcontroller may devote far less of its resources to processing bytes received in the byte mode than in the sample mode possibly resulting in a reduction in power consumed by the microcontroller. Also, although not separately shown, a unit may be provided for changing the clock rate of the microcontroller when in the byte mode to operate at a lower clock rate thereby consuming even less power. Reduction of power consumption is particularly critical within cellular phone 14 since it may need to operate solely from a battery source of limited power. Of course, to process the input data as bytes, rather than as samples, requires that the UART be programmed with the baud rate of the input bytes. Techniques for determining the baud rate of the input bytes will now be described with reference to the remaining figures.

Briefly, determination of the baud rate of received input signals is performed as follows. The wave form is sampled to yield a digital representation of the wave form which is compared against known wave forms to determine a match and thereby determine the identity and rate of the input byte. In the exemplary embodiment, wherein data signals are transmitted in accordance with EIA-602-1992 or RFC-1662 133 protocols, the starting byte of each command sequence is either a 0x7E network interface flag byte or an "A" or "a" character. Remaining bytes within a command sequence may be 'T', '4', or '/'. The number of sample bytes occurring within selected portions of the input byte are counted and compared against a table of expected values. For a high baud rate, there will be relatively few samples within the selected portions. For a lower baud rate, there may be hundreds of samples within the selected portions. Hence, the number of counted samples allows the baud rate to be determined.

Figure 3:
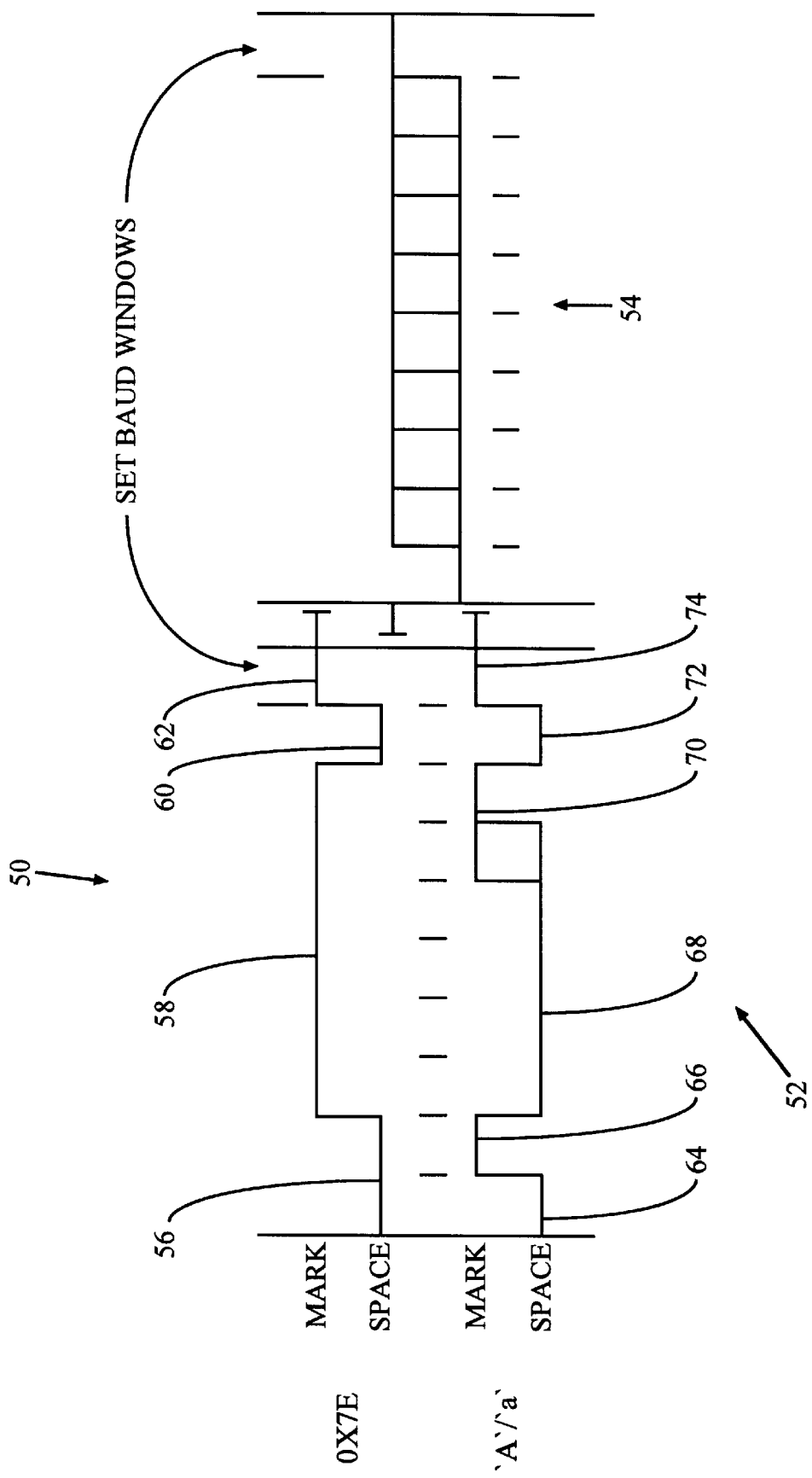
FIG. 3 is a timing diagram illustrating exemplary starting bytes for command sequences in accordance with two different data transmission protocols.

FIG. 3 provides a waveform 50 representative of the 0x7E flag and a waveform 52 representative of either "A" or "a" character. In FIG. 3, the "A" and "a" characters are shown superimposed with the "a" character represented partially in dotted lines. FIG. 3 also shows a second input byte 54 shown almost entirely in dotted lines which may represent any acceptable character. As can be seen from FIG. 3, each character includes a portion of spaces representative of zero bits and a portion of marks representative of one bits. The 0x7E flag includes a first space 56 representative of two zero bits, a first marking portion 58 representative of six one bits, a second space 60 representative of one zero bit, then a marking stop bit 62. The "A" character also includes a first space 64 representative of a zero start bit, a first marking portion 66 representative of one bit, a second space portion 68 representative of five zero bits, a second marking portion 70 representative of one one bit, a third space 72 and a stop bit 74. The "a" character differs from the "A" character only in that the second spacing portion 68 represents four bits rather than five bits and the second marking portion represents two bits rather than one bit.

Hence, each of the three acceptable first starting bytes has a unique profile. Digital representations of these profiles are stored within the microcontroller (FIG. 2) and received samples are compared against those representations to determine whether the received samples correspond to a 0x7E flag or a "A" or "a" character. In this regard, the received samples may be analyzed to determine whether each sample corresponds to a portion of a spacing bit or a marking bit. Then, the relative placement of the spacing bits and marking bits within the byte is determined to thereby identify the type of data byte. For example, the "A" and "a" characters may be distinguished by comparing the ratio of the number of marking bit samples to spacing bit samples. Other methods may alternatively be employed. Once the identity of the starting byte has been determined, baud rate detection can proceed.

For the 0x7E flag byte, the baud rate is detected by counting the number of samples occurring during the first marking portion 58 of the byte. The counted number of samples are compared against the expected number of samples for each of a set of acceptable baud rates to determine the actual baud rate. For the "A" and "a" characters, the number of samples occurring during the second space portion 68 and the second marking portion 70 are compared against expected numbers of samples to determine the baud rate.

Table I sets forth exemplary ranges for the number of expected samples for the "a," "A" and 0x7E flag bytes for each of six acceptable baud rates. More specifically, Table I provides minimum and maximum expected counts for the second spacing and second marking portions of the "a" and "A" characters and minimum and maximum expected count values for the first marking portion of the 0x7E flag for baud rates of 1200, 2400, 4800, 9600, and 19.2 k. To determine the baud rate, the actual number of counted samples is compared against the ranges specified within the table for the character type that has already been determined. For example, if it has already been determined that the starting byte is a 0x7E flag character, then the number of samples counted during the first marking portion are compared against the minimum and maximum values specified for the flag character to determine which range the count lies within. Then, the baud rate, corresponding to that range, is read from the table. In other implementations, the Table may also include values for other baud rates such as 14.4 k and 38.4 k baud rates.

represented by a total of 19 samples. (Sampling does not begin until 52 microseconds into the starting byte. Hence, for a baud rate of 19.2 k, only one sample is taken during the starting bit.) For the 0x7E byte, about 11 or 12 samples will be detected during the first marking portion. This value, when compared against the values of Table I, reveals that the corresponding baud rate is 19.2 kilobaud.

Figure 4A:
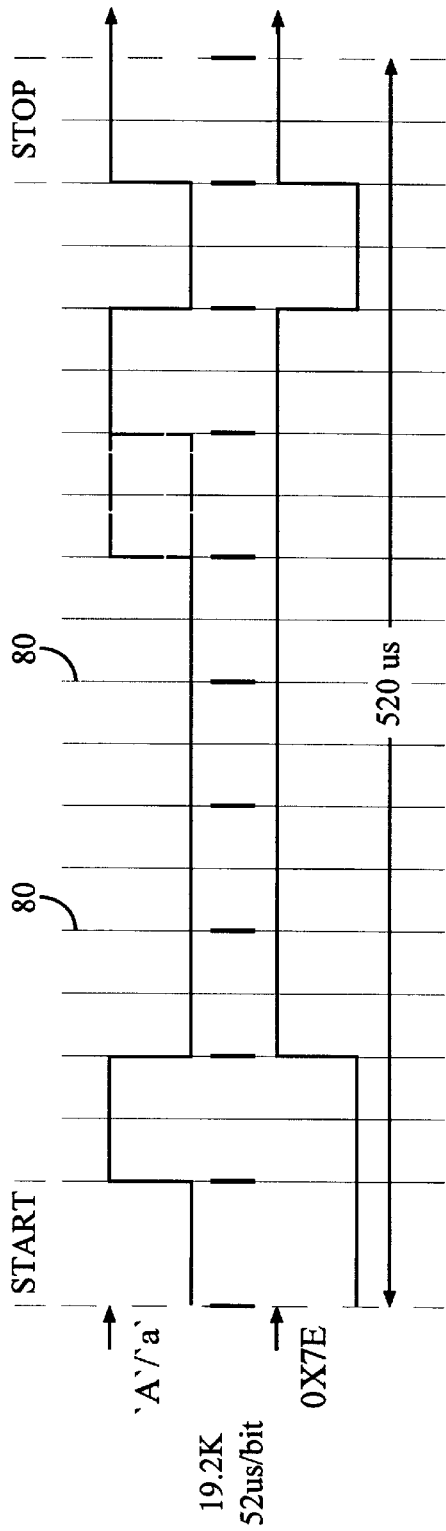
Figure 4B:
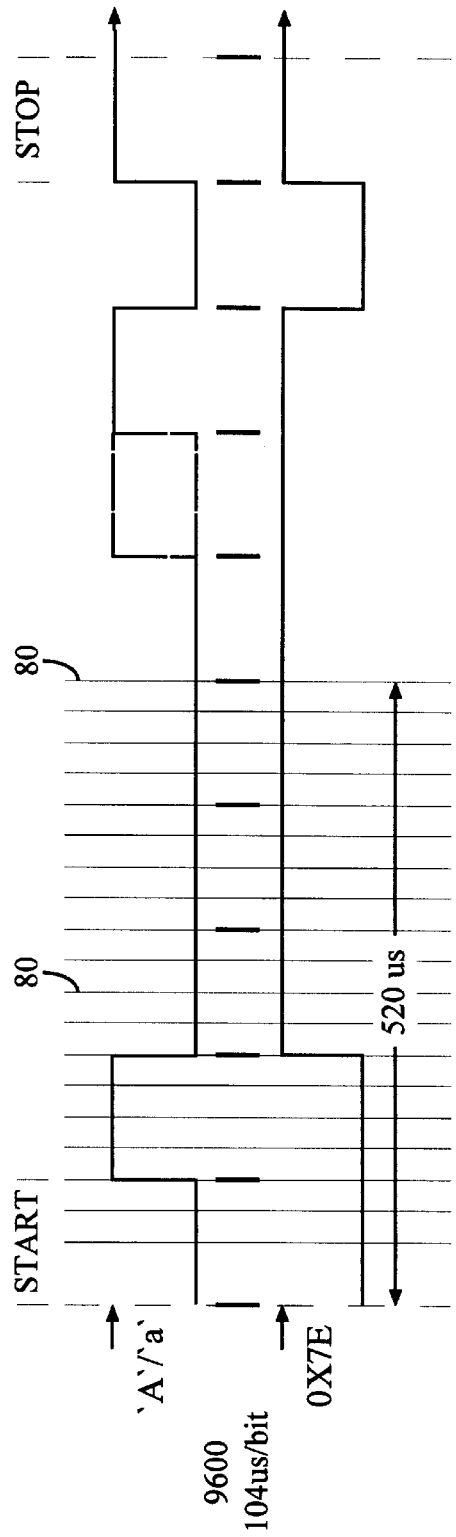

FIG. 4B illustrates the sampling of signals received at 9600 baud. As can be seen, the samples appear closer together. However, sample spacing remains at 26 microseconds per sample. The samples appear closer together only because the bytes as shown therein are received over a longer period of time. FIGS. 4C–4E show an even greater compression of samples with respect to the received byte. For a 0x7E signal received at 9600 baud (FIG. 4B), about 24 or 25 samples will be detected during the first marking portion. Accordingly, when this value is compared with the values of Table I, a baud rate of 9600 is determined.

Hence, the baud rate is determined by first identifying the type of character received within the starting byte and then comparing counts of samples against expected counts using Table I. Once the baud rate is known, the microcontroller signals the UART to begin to receive data at the known baud rate. The UART continues to process data in the byte mode until the last byte of a command line or string has been received. If the command line was a dial command, or the start byte of a packet was detected at the beginning of the command line, the UART remains in byte mode. Otherwise, the UART returns to sample mode at the end of the command line or string and the baud rate is redetermined for the next character string. With RS232E protocol, the end of a command string can be determined, and hence the start of the next command string can also be determined. At that time, the UART is switched back to the sample mode and the baud rate for the next command string is determined from the next starting byte. Depending upon the implementation, it is possible that the first starting byte of the first command sequence will not be detected such that the entire first command sequence will be processed only in the sample mode. However, the carriage return character at the end of the first command sequence will uniquely identify the next character received as the starting byte of the next command sequence. Hence, baud rate detection can begin. In other implementations, a method may be provided for detecting the starting character of the first command sequence as well.

Figure 5:
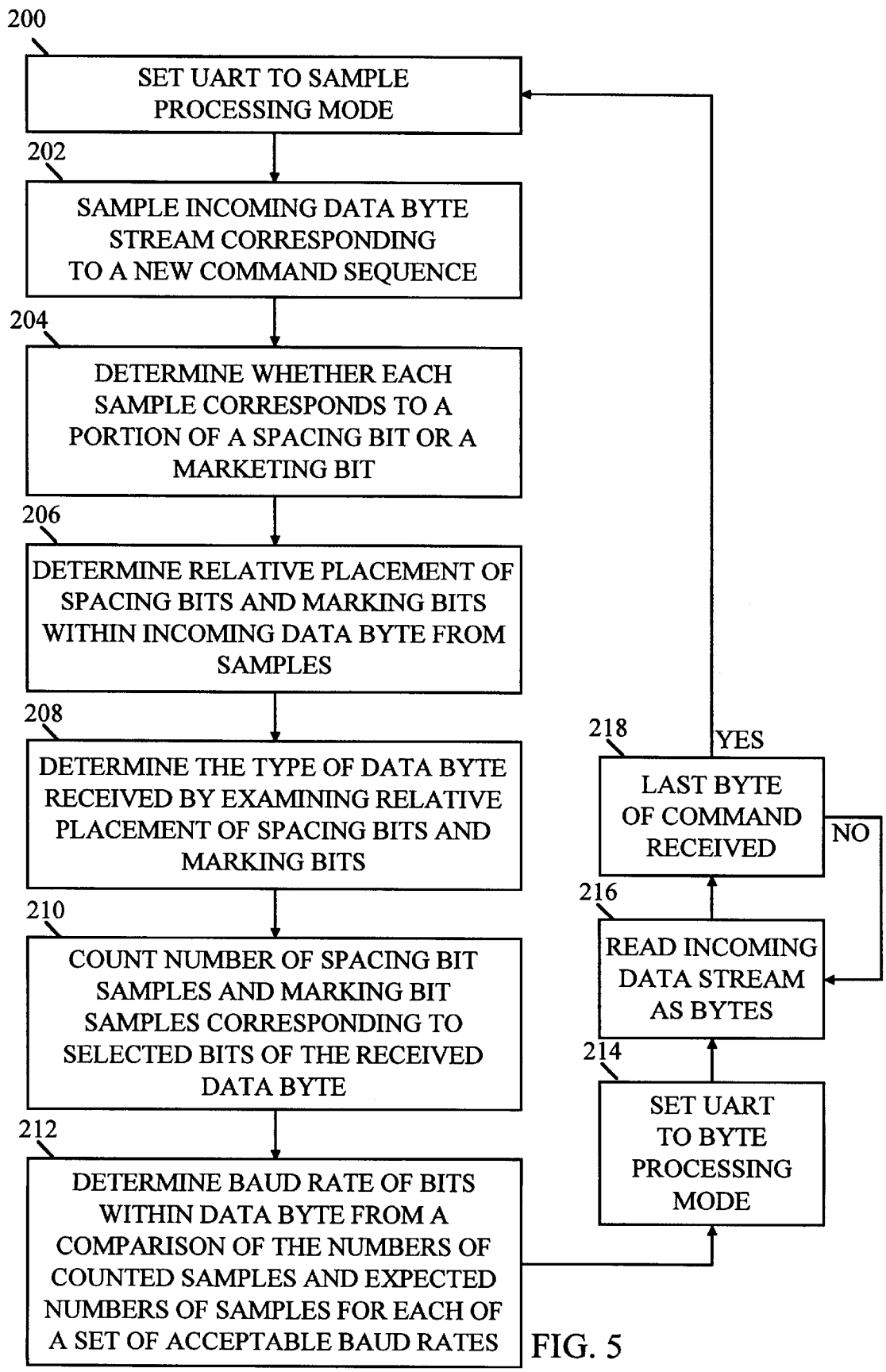
FIG. 5 is a flowchart illustrating a method for processing data, including baud rate detection, using the cellular telephone of FIG. 1.

FIG. 5 summarizes the above-described steps. Initially, at step 200, the UART is set to a sample processing mode. The

TABLE I

| | | | 'a' | | | | 'A' | | | | Flag | |
|---|---|---|---|---|---|---|---|---|---|---|---|---|
| | bit | Fifo | 2nd Space | | 2nd Mark | | 2nd Space | | 2nd Mark | | 1st Mark | |
| rate | count | level | min | max | min | max | min | max | min | max | min | max |
| 1200 | 32 | 25 | 124 | 132 | 60 | 68 | 156 | 164 | 30 | 34 | 188 | 196 |
| 2400 | 16 | 12 | 60 | 68 | 30 | 34 | 78 | 82 | 14 | 18 | 94 | 98 |
| 4800 | 8 | 7 | 30 | 34 | 14 | 18 | 38 | 42 | 7 | 9 | 46 | 50 |
| 9600 | 4 | 0 | 15 | 17 | 7 | 9 | 19 | 21 | 3 | 5 | 22 | 26 |
| 19.2 | 2 | 0 | 7 | 9 | 3 | 5 | 9 | 11 | 2 | 3 | 11 | 13 |

FIGS. 4A–4E illustrate "A," "a" and 0x7E bytes for five different baud rates with sampling points superimposed.

FIG. 4A illustrates the acceptable starting bytes for a baud rate of 19.2 kilo baud wherein sampling points 80 are shown superimposed in dotted lines. The sampling points are spaced 26 microseconds apart such that the entire byte is incoming data byte stream of a new command sequence is sampled, step 202. The samples are analyzed, step 204, to determine whether each sample corresponds to a portion of a spacing bit or a marking bit. The relative placement of spacing bits and marking bits within the incoming data byte is determined, step 206. At step 208, the type of data byte is determined by examining the relative placement of the spacing bits and the marking bits. In other words, a determination is made as to whether the starting byte is an "a," "A" or 0x7E flag. Once the type of data byte is determined, the number of spacing bit samples and marking bit samples are counted within selected portions of the received data byte. As noted above, for the 0x7E flag, the number of samples within the first marking portion are counted. For the "a" and "A" characters, the number of samples within the second spacing and second marking portions are counted. The baud rate for the received data is determined, at step 212, from a comparison of the numbers of counted samples to expected numbers of samples for each of the acceptable baud rates. This is performed using the values of Table 1, which may be stored within the microcontroller. Once the baud rate is determined, the UART is set to the byte processing mode, step 214, and additional bytes of the input data stream are read as bytes rather than samples, step 216, until the last byte of the command is received, step 218. Thereafter, execution returns to step 200 where the UART is reset to sample mode prior to a determination of the baud rate for the next command sequence.

Figure 6:
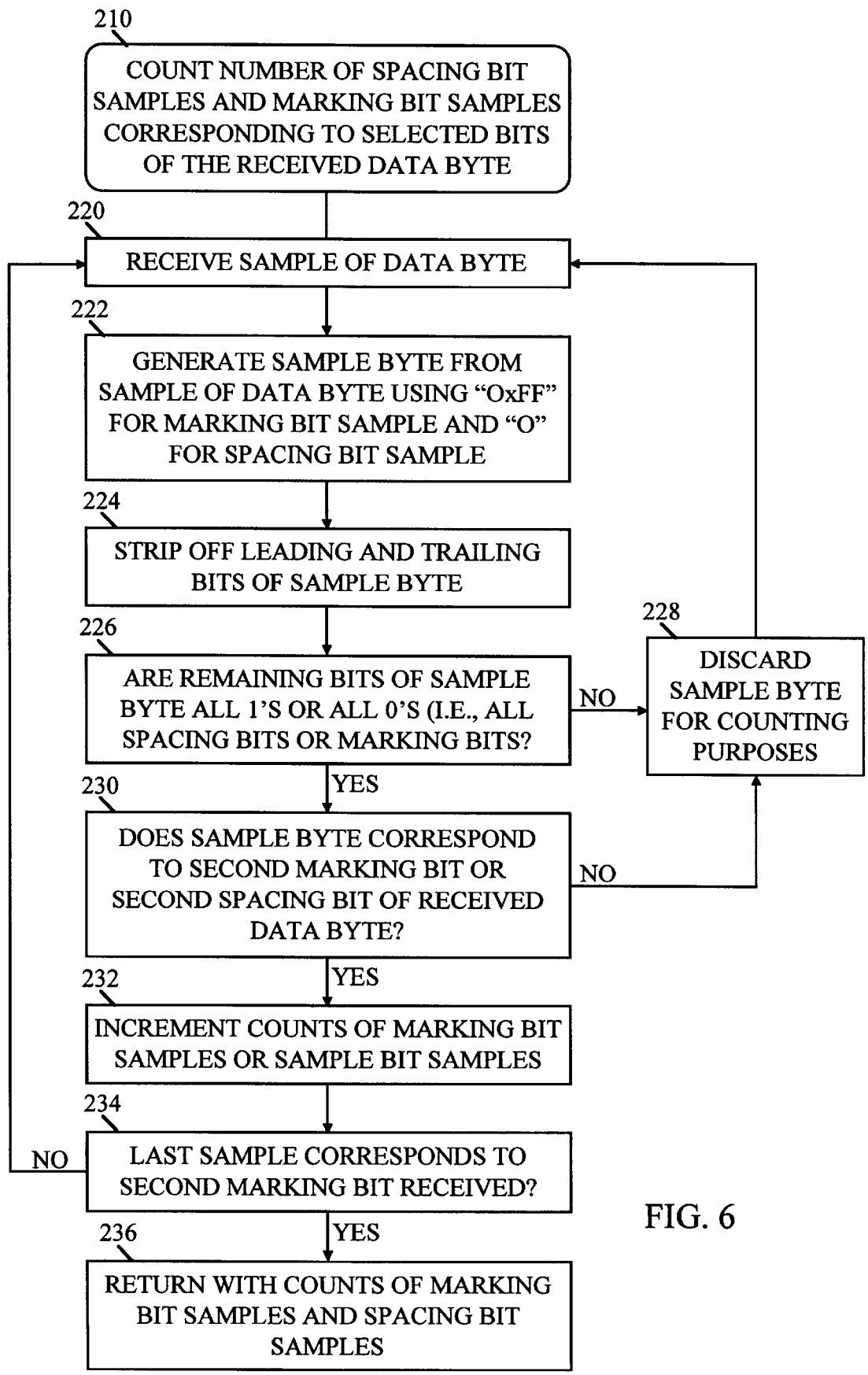
FIG. 6 is a flowchart illustrating a method for counting spacing bit samples and marking bit samples in accordance with the method of FIG. 5.
Figure 7:
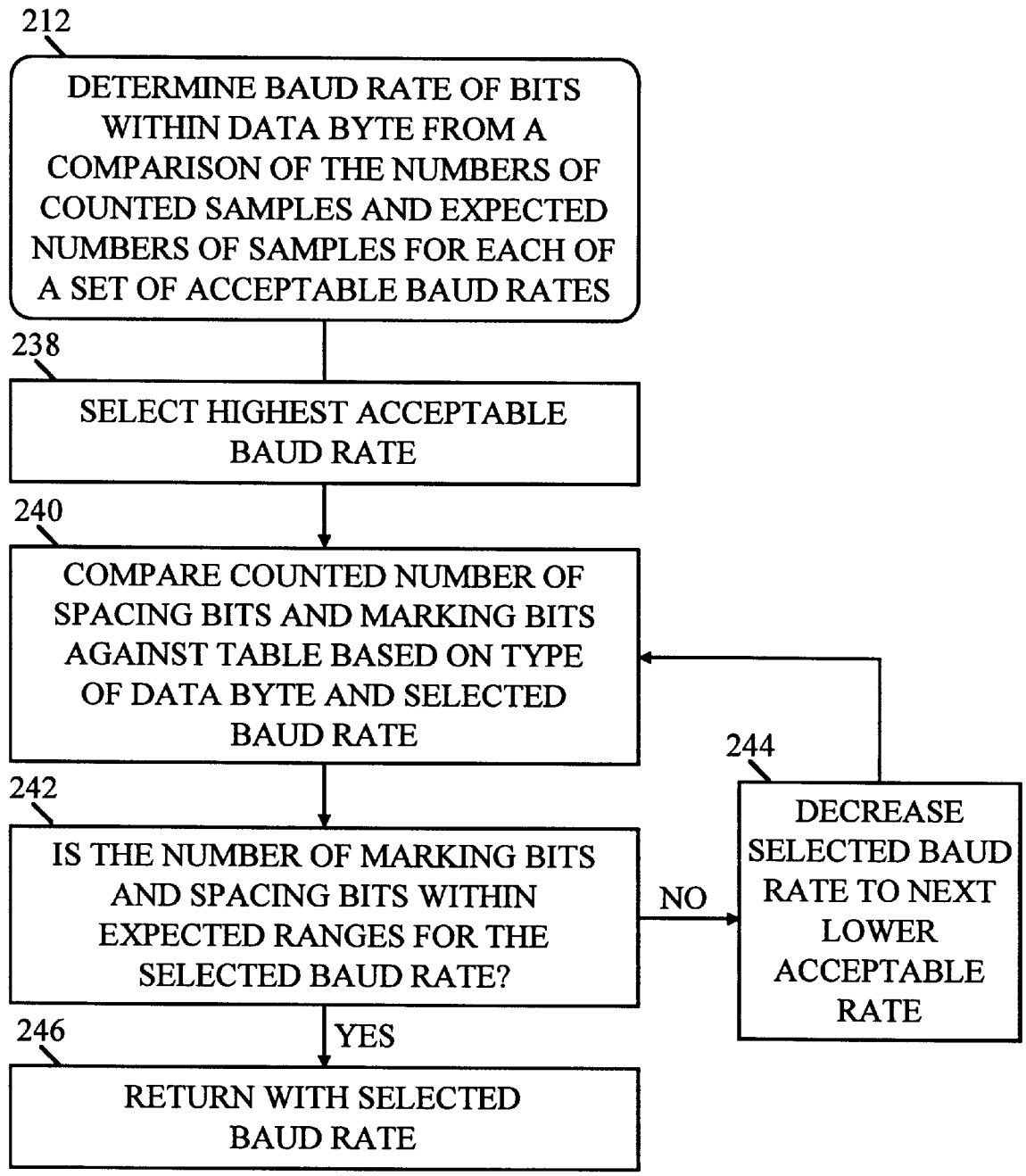
FIG. 7 is a flowchart illustrating a method for determining baud rates in accordance with the method of FIG. 5.
Figure 8:
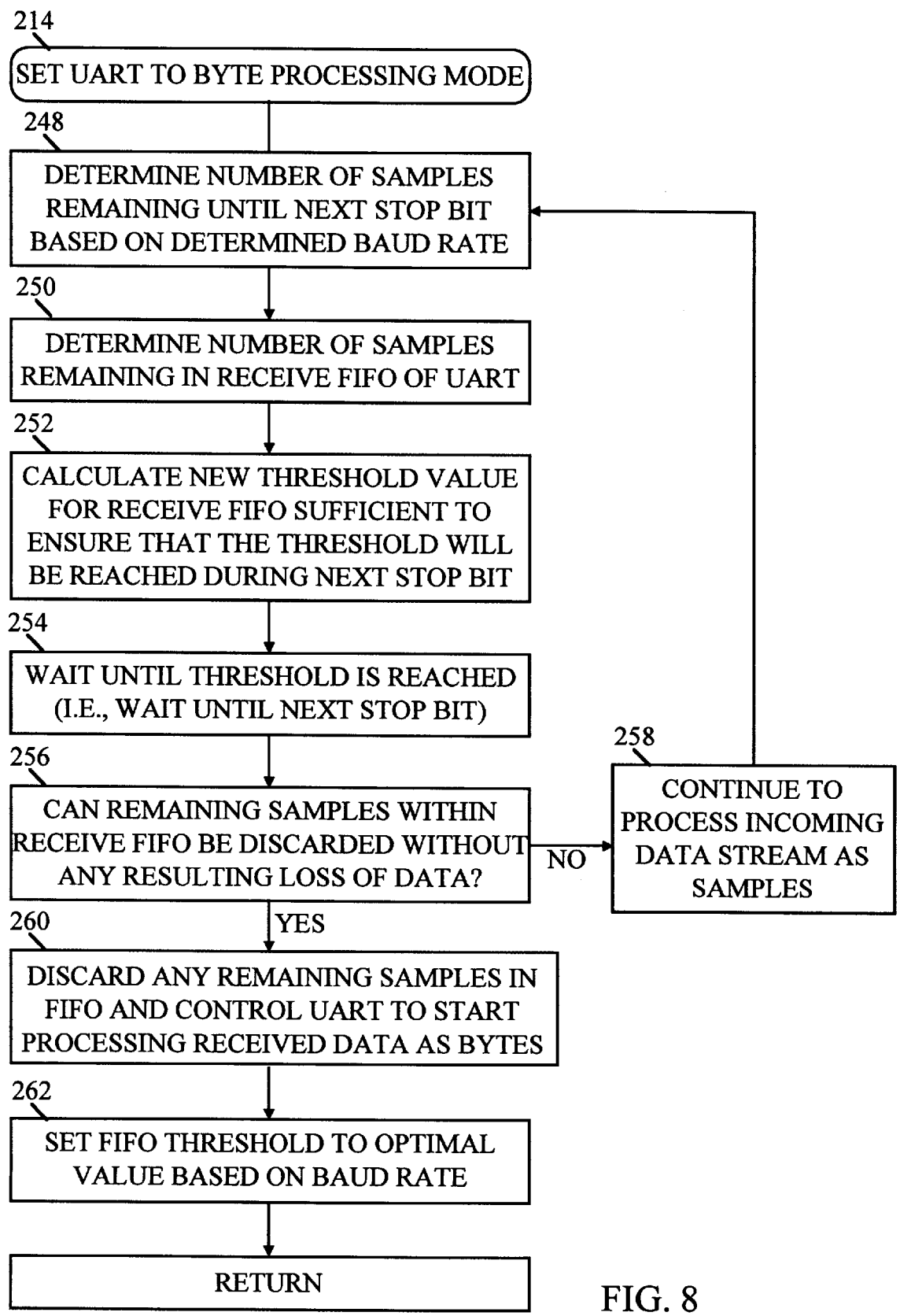
FIG. 8 is a flowchart illustrating a method for setting a UART to a byte processing mode in accordance with the method of FIG. 5.

Details of the implementation of steps 210, 212, and 214 are set forth in FIGS. 6, 7, and 8 respectively. Referring first to FIG. 6, the step of counting the number of spacing bit samples and marking bit samples for the "a" and "A" characters is performed as follows. Initially, at step 220, a sample of the voltage of the input data byte is received. At step 222, a sample byte is generated from the detected voltage. If the sample represents a portion of a marking bit, i.e., the voltage sample is at about 3.3 volts, the sample is assigned a byte value of 0XFF. If the sample voltage is representative of a spacing bit, i.e., the voltage is at about 0 volts, then the sample is representative by a byte of "0". Samples having voltage values between 0 and 3.3 volts are assigned appropriate byte values scaled there between. Typically, only samples detected at a transition between a space and a mark will have a voltage value somewhere between 0 and 3.3 volts. However, noise in the detected signal may cause the voltages of spacing portions or marking portions to deviate from the expected values.

At step 224, the leading and trailing bits of the sample byte are removed. The leading and trailing bits of each sample mode byte are removed to insure the sample mode byte represents the state (marking or spacing) condition at the midpoint of the sample collection. This is only relevant on the first and last sample byte of each bit transition but is done to all sample bytes for the purpose of expediency.

All remaining bits of the sample byte are examined, step 226, to determine whether the remaining bits correspond to all ones or all zeros. If not, then the sample byte is simply discarded for counting purposes, step 228, and execution returns to step 220 where a subsequent sample is processed. Sample bytes which do not have either all ones or all zeros, after the leading and trailing bits are removed, are discarded because those bytes do not reliably correspond to a spacing portion or a marking portion of the input byte.

For sample bytes wherein the middle bits are all ones or all zeros, execution proceeds from step 226 to step 230 where the sample byte is analyzed to determine whether it corresponds to the second marking bit portion or second spacing bit portion of the receive data byte. This may be performed by tracking the order of spacing samples and marking samples. If the sample byte does not correspond with the second marking bit or the second spacing bit, the byte is again discarded, step 228, and another sample is processed beginning at step 220. If, however, the sample byte does correspond with the second marking bit or second spacing bit, then the appropriate spacing bit count or marking bit count is incremented, step 232. If, at step 234, it is determined that the last sample corresponding to the second marking bit has been received, then the count is complete, step 236. If additional samples are available, then execution again returns to step 220 to process the additional samples.

Thus, FIG. 6 sets forth one method for counting samples for use in comparison with the values of Table 1. As noted, FIG. 6 assumes that the character received is either a "a" or "A." For a 0x7E flag, the logic of steps 230 and 234 differ slightly to accommodate counting of samples within a first marking portion, rather than second spacing portions and second marking portions as required for the "a" and "A" characters.

FIG. 7 sets forth steps performed during actual determination of the baud rate corresponding to step 212 of FIG. 5. Initially, at step 238, the highest acceptable baud rate is selected. For the present example, the highest acceptable baud rate is 38.4 kilobaud. Next, at step 240, the counted numbers of samples achieved using the method of FIG. 6 are compared against the values contained in Table 1. If, at step 242, the number of marking bit samples and spacing bit samples are not within the expected range for the selected baud rate, then the baud rate is decreased to the next lower acceptable rate, step 244, and execution returns to step 240. If, however, the count of sample bits and marking bits is within the expected range for the current selected baud rate, then that baud rate is identified as the correct baud rate for the received input bytes, step 246.

FIG. 8 illustrates the steps performed to set the UART to the byte processing mode corresponding to step 214 of FIG. 4. The steps are performed to ensure that no data is lost when the UART is switched from sample mode to byte mode. Briefly, switching to byte mode is performed only during processing of a stop bit and only if the receive FIFO of the UART is sufficiently empty. By "sufficiently" empty, it is meant that the receive FIFO of the UART either is completely empty or any remaining samples therein can be reliably assured to be stop bit marking bytes. If the UART is reset to the byte mode before the stop bit of the current input byte or after the stop bit of the current byte, then the UART may begin to process the input bits in the middle of the next byte, rather than at the beginning, causing incorrect translation of the data. If the receive FIFO is not sufficiently empty, either data may be lost when the mode is switched, or new input bytes will be added to the FIFO resulting in possible mistranslation of the data. If, on the other hand, the receive FIFO is empty, or can be safely emptied, while the UART input shift register is marking, then there will be no misinterpretation of the input stream. Remaining samples therein can be reliably assured to be stop bit Marking bytes. If the UART is reset to the byte mode before the stop bit of the current input byte, or after the stop bit of the current byte, then the UART may begin to process the input bits in the middle of the next byte, rather than at the beginning, causing incorrect translation of the data. If the receive FIFO is not sufficiently empty when the mode is switched, either data may be lost when the mode is switched, or incorrect interpretation of the input stream could result. If, on the other hand, the receive FIFO is empty, or can be assured that the UART input shift register is Marking on the stop bit or in an idle condition, then there will be no misinterpretation or loss of incoming data.

The foregoing conditions are verified as follows. Initially, at step 248, the number of samples remaining until the next stop bit is determined based upon the current position within the current data byte and upon the baud rate which has already been determined. Then, at step 250, the number of samples remaining within the receive FIFO of the UART are determined. At step 252, a new threshold value for the receive FIFO is calculated. The new threshold is set to ensure that the threshold will be reached during the next stop bit. For example, if there are 30 sample bytes remaining within the receive FIFO and there will be another 120 samples before the next stop bit is reached, then the threshold value for the FIFO will be set to 150 bytes such that the next threshold interrupt generated by the receive FIFO will occur during processing of the next stop bit. By deferring the next interrupt until the next stop bit is processed, it is assured that the microcontroller does not attempt to set the UART to the byte processing mode until the next stop bit is encountered, and therefore necessary CPU processing is reduced.

At step 254 the microcontroller waits until the next interrupt is received indicating that the threshold has been reached and further indicating that the next stop bit has been reached. Thereafter, the microcontroller determines whether any remaining samples within the receive FIFO can be safely discarded without any resulting loss of data, step 256. If remaining bytes within the receive FIFO cannot safely be discarded, then execution proceeds to step 258 where the UART continues to process incoming data bytes as samples. Thereafter, steps 248–256 are repeated until either the receive FIFO is empty or any remaining bytes therein can safely be discarded. At that time, execution proceeds to step 260 where any such remaining samples are discarded and the UART is controlled to begin processing receive data as input bytes. Finally, at step 262, the FIFO threshold is reset to an optimal value based upon the current baud rate. More specifically, the threshold is set to a value which will ensure that the microcontroller is not interrupted too often while also ensuring that the receive FIFO does not overflow resulting in possible loss of data. Exemplary FIFO threshold values for use at step 262 are set forth in Table 1 above within a column entitled FIFO level. The Table also includes a bit count value which identifies the number of samples per bit of an input data byte. This value is employed by the microcontroller to expedite calculation of the number of sample bits remaining until the next stop bit. The bit count value may also advantageously be employed in other calculations such as in calculating whether a current sample is a portion of the second space or second mark of an "a" or "A" character or within the first mark of a flag character.

What has been described is a method and apparatus for switching a UART from a sample mode to a byte mode to expedite processing of input data, particularly to minimize usage of a microcontroller to minimize power consumption with no loss of data. The mode of the UART is switched only after the baud rate of incoming data is determined and only in circumstances where the switch can be accomplished without risking any loss of data. The method and apparatus has been described primarily with reference to flowcharts which summarize key steps of one exemplary method.

Figure 9:
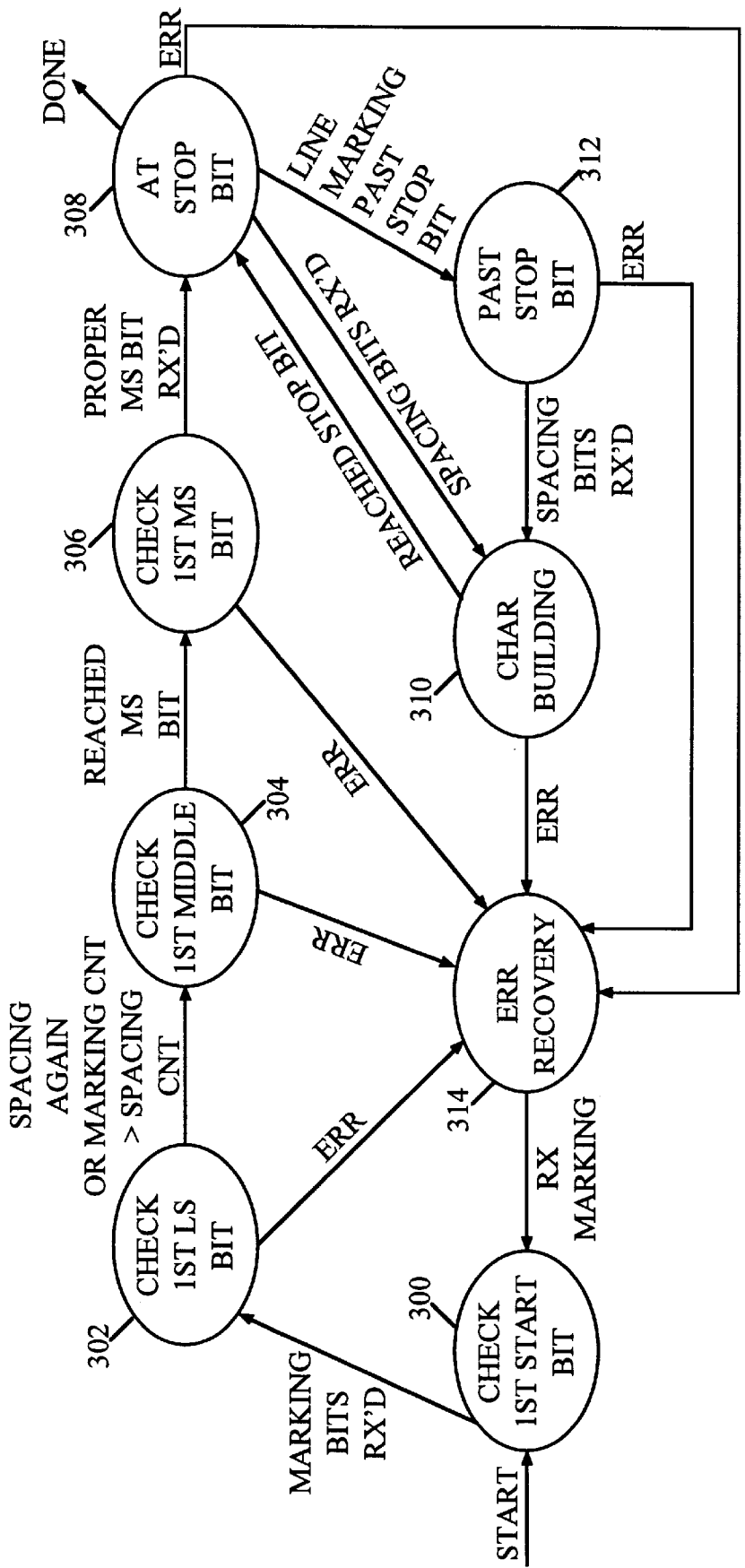
FIG. 9 is a state diagram illustrating a state machine for use in performing the method of baud rate detection of FIGS. 5–8.
Figure 10:
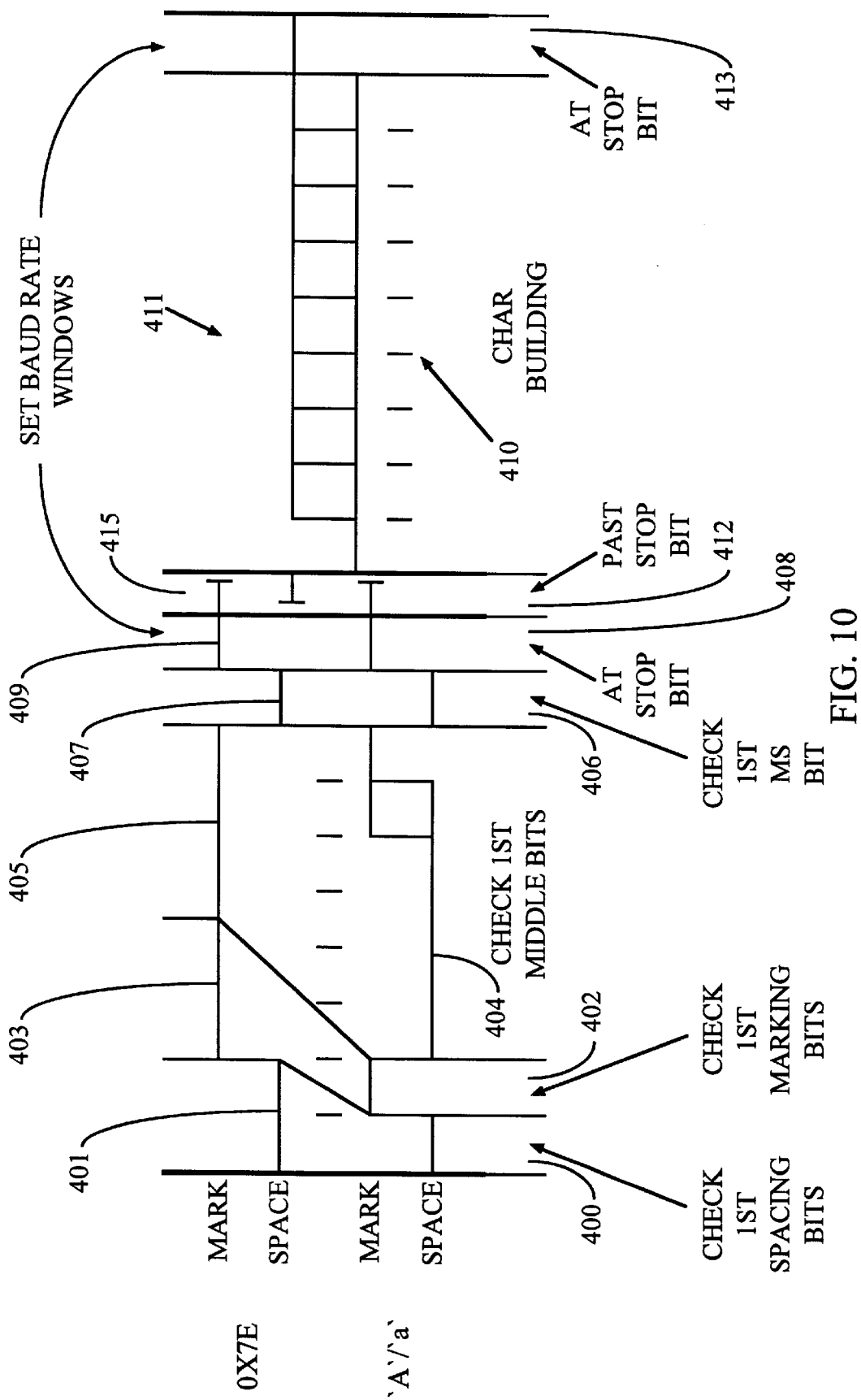
FIG. 10 is a timing diagram providing a mapping of incoming bits of a starting byte to baud rate detection states set forth in the state machine of FIG. 9.

FIG. 9 illustrates a state machine for handling baud rate detection in accordance with the method of FIGS. 5–8. FIG. 10 illustrates sample starting bytes for "A"/"a" and for "0x7E" and provides a mapping to states of the state diagram of FIG. 9. The method defined by the state diagram of FIG. 9 generally corresponds with the method of FIGS. 5–8 but includes some additional detail particularly related to the timing of the performance of the method steps in relation to the timing at which bits of input data bytes are received. FIGS. 9 and 10 will be described together.

The states of FIG. 9 will first be described with respect to the "A"/"a" byte of FIG. 10. At state 300 of FIG. 9, sample bytes corresponding to the first starting bit of the input data are checked to determine when sample bytes corresponding to the first marking bit are received. Within FIG. 10, the starting bit is identified by spacing portion 400. During state 300, sample bytes corresponding to starting bit 400 are examined. Once the first marking bit is detected, the state machine transitions to state 302 wherein the first "LS" bit 402 (also referred to herein as the first marking bit) is processed. The first LS bit is processed to determine when sample bytes corresponding to a next spacing bit are received—at which time the state machine transitions to state 304.

Within state 304, the first middle bits (also referred to herein collectively as the second spacing portion and second marking portion) are processed. Within FIG. 9, the first middle bits are collectively identified by reference numeral 404. The state machine transitions to state 306 only when sample bytes corresponding to a first MS bit 406 (also referred herein as a third spacing portion) have been received. Within state 306, the sample bytes are examined to identify whether a proper MS bit has been received. By "proper", it is meant that the MS bit is a spacing bit of single bit duration. Once the state machine determines that a proper MS bit has been received, the state machine transitions to state 308 which corresponds to stop bit 408 of FIG. 9. While in state 308, the state machine can attempt to reset the UART to byte mode if, as noted above, the received FIFO is sufficiently empty. A determination whether the receive FIFO is sufficiently empty may be performed in accordance with the method of FIG. 8 above. Actual determination of the baud rate may be performed at any time following state 304 based upon spacing byte counts and marking byte counts detected during states 302 and 304, respectively. In the exemplary embodiment, actual calculation of the baud rate occurs during state 308.

As noted, during state 308, the microcontroller attempts to determine whether the receive FIFO is sufficiently empty to allow the UART to be reset to byte mode. While this determination is made, the state machine continues to process received sample bytes to determine whether either additional spacing bytes have been received or whether the stop bit has been passed. The reception of additional sample bytes corresponding to spacing bits indicates that the UART has already begin processing the next input data byte. If so, it is too late to set the UART to byte mode. Accordingly, the state machine transitions to state 310, which corresponds to a character building state during which characters corresponding to a nonstarting byte are processed. Within FIG. 9, bits corresponding to character building are collectively identified by reference numeral 410. The state machine remains within state 310 until the count of received sample bytes indicates that the stop bit of the serial byte is being received, at which point the state machine returns to state 308.

A determination, during state 308, that the stop bit has been passed causes a transition to state 312. The time period corresponding to state 312 is identified in FIG. 9 by reference numeral 412. This represents a period of time following the stop bit but prior to receipt of a first spacing bit corresponding to a next input byte. In other words, this state corresponds to a gap between the end of the previous input byte and the beginning of the next input byte. Such a gap may occur as a result of jitter or noise within the input signal or as a result of normal delay between the reception of asynchronous serial bytes. Once the first sample bytes corresponding to the first spacing bit of the next input byte are received, the state machine transitions from state 312 to character building state 310. Again, the state machine eventually transitions back to state 308 following detection of the next stop bit. States 308, 312 and 310 are repeatedly accessed until the UART can be safely switched to byte mode during an occurrence of state 308. At that point, the state machine exits state 308 and suspends operation until being reactivated following reception of a carriage return character, or other command string termination character, at which point the state machine is restarted at state 300. Within FIG. 9, a second stop bit corresponding to a second transition to state 308 is identified by reference numeral 413.

Also, with regard to the state machine of FIG. 9, an error may be detected during almost any of the states. All such errors result in a transition to an error state 314 during which time appropriate steps are taken to process the error. The steps to be taken depend upon the nature of the error and may require, for example, requesting a resend of the input data corresponding to the current command sequence as a result of lost or untranslatable data. The error recovery state is exited upon reception of additional sample bytes corresponding to a marking bit causing a transition back to state 300.

Now, the states of FIG. 9 will be briefly described with respect to the 0x7E byte of FIG. 10. Within FIG. 10, byte portions 401, 403, 405, 407 and 409 correspond with states 300, 302, 304, 306 and 308, respectively of FIG. 9. As can be seen, the starting bit for the 0x7E byte is a 2 bits wide, rather than 1 bit wide. Also, the first marking bit for the 0x7E byte is about 2 bits wide, rather than only 1 bit wide. Also, the middle bits 405 of the 0x7E byte are all marking bits whereas the middle bits for the "A"/"a" bytes include both spacing bits and marking bits. As a result, for the 0x7E byte, a transition from state 302 to state 304 is not deferred until an additional spacing bit is encountered. Rather, the transition occurs once a count of sample bytes within the marking bit portion exceeds a count of the sample bytes within the initial starting bit spacing portion. In other words, the state machine transitions from state 302 to 304 for the 0x7E bit when the number of marking samples counted exceeds the number of spacing samples. In all other respects, the processing of samples corresponding to the 0x7E byte corresponds to that of the "A"/"a" byte. For example, character building state 310 is accessed during character building phase 411 and state 312 is accessed during gap 415 of FIG. 10.

The state machine represented by FIG. 9 may be implemented in software, hardware or with any other appropriate technology. The state machine may, for example, form a portion of the microcontroller or may form software running on the microcontroller. Alternatively, the state machine may be implemented as a separate device connected to the microcontroller or perhaps connected directly to the UART.

The invention has been described with reference to various exemplary embodiments set forth in the accompanying drawings. These embodiments merely illustrate principles of the invention and should not be construed as limiting the scope of the invention. Rather, principles of the invention may be exploited in a wide range of embodiments for use in a wide range of applications to achieve the objectives and goals set forth herein or to achieve other objectives and goals as well.

What is claimed is:

1. For use in a cellular telephone having a serial port and a universal asynchronous receive and transmit (UART) device, a method comprising the steps of:

controlling the UART to sample data received from the serial port;

receiving signals from the UART representative of the samples;

determining, from an examination of the samples, the baud rate of the bytes within the data received through the serial port; and controlling the UART to terminate sampling of the data and to instead process the data as bytes of data in accordance with the determined baud rate, including the steps of:

a) determining whether a receive first in first out (FIFO) queue of the UART is sufficiently empty;

b) determining whether the latest sample received from the FIFO queue of the UART represents a portion of a stop bit of a corresponding byte; and c) switching the UART from a sample processing mode to a byte processing mode only if the receive FIFO is sufficiently empty and only if the latest sample received corresponds to a portion of a stop bit.

2. The method of claim 1 wherein the step of determining the baud rate comprises the steps of:

identifying the starting byte of a command sequence;

determining a number of samples within selected portions of the starting byte; and calculating the baud rate from a comparison of the number of samples in the selected portions of the starting byte with predetermined numbers of samples expected to be found within bytes of pre-selected acceptable baud rates.

3. The method of claim 2 wherein the steps of controlling the UART to terminate sampling of the data and instead process the data as bytes further includes the steps of:

determining a number of samples remaining until samples corresponding to a next stop bit are encountered;

determining the number of samples currently stored within the receive FIFO queue of the UART; and setting a threshold level for the receive FIFO queue of the UART based upon the current number of samples in the FIFO and upon the number of samples to be received before the next stop bit to ensure that the threshold level for the FIFO is reached during the next stop bit.

4. The method of claim 2 wherein starting bytes include bytes representative of "a," "A" and "0x7E."

5. The method of claim 1 wherein the step of determining the baud rate is performed on a command sequence by command sequence basis.

6. The method of claim 2 wherein the step of calculating includes the steps of:

determining the number of samples received by the UART representative of a second space within the starting byte;

determining the number of samples received by the UART representative of a second marking bit within the starting byte; and comparing the respective number of samples within the second spacing bit and within the second marking bit with predetermined numbers of samples expected to be found within the respective second spacing bit and second marking bit for each of a pre-selected set of baud rates.

7. The method of claim 6 wherein the step of comparing includes the step of examining a table specifying a minimum and maximum expected number of samples within the second spacing bit and within the second marking bit for each of a plurality of acceptable starting bytes for each of the predetermined acceptable baud rates.

8. An apparatus for use within a cellular telephone, said apparatus comprising:

a serial port;

a universal asynchronous receive and transmit (UART) device connected to the serial port;

a microcontroller device comprising:
  a) means for controlling the UART to sample data received from the serial port;
  b) means for receiving signals from the UART representative of the samples;
  c) means for determining, from an examination of the signals, the baud rate of bytes within the data received through the serial port; and
  d) means for controlling the UART to terminate sampling of the data and to instead process the data as bytes of data in accordance with the determined baud rate comprising:
    i) means for determining whether a receive first in first out (FIFO) queue of the UART is empty;
    ii) means for determining whether the latest sample received from the FIFO queue of the UART represents a portion of a stop bit of a corresponding byte; and
    iii) means for switching the UART from a sample processing mode to a byte processing mode only if the receive FIFO is sufficiently empty and only if the latest sample received corresponds to a portion of a stop bit; and a parallel transmission path interconnecting the UART and the microcontroller.

9. The apparatus of claim 8 wherein the means for determining the baud rate comprises:

means for identifying the starting byte of a command sequence;

means for determining a number of samples with selected portions of the starting byte; and means for calculating the baud rate from a comparison of the number of samples in the selected portions of the starting byte and predetermined numbers of samples expected to be found within bytes of pre-selected acceptable band rates.

10. The apparatus of claim 8 wherein the means for controlling the UART to terminate sampling of the data and instead process the data as bytes further includes:

means for determining a number of samples remaining until samples corresponding to a next stop bit are encountered;

means for determining the number of samples currently stored within the receive FIFO queue of the UART; and means for setting a threshold level for the receive FIFO queue of the UART based upon the current number of samples in the FIFO and upon the number of samples to be received before the next stop bit to ensure that the threshold level for the FIFO is reached during the next stop bit.

11. The apparatus of claim 9 wherein starting bytes include bytes representative of "a," "A" and "0x7E."

12. The apparatus of claim 8 wherein the means for determining the baud rate operates on a command sequence by command sequence basis.

13. The apparatus of claim 9 wherein the means for calculating includes:

means for determining the number of samples received from the UART representative of a second spacing bit within the starting byte;

means for determining the number of samples received from the UART representative of a second marking bit within the starting byte; and means for comparing the respective number of samples within the second spacing bit and within the second marking bit with predetermined numbers of samples expected to be found within the respective second spacing bit and second marking bit for each of a pre-selected set of baud rates.

14. The apparatus of claims 13 wherein the means for comparing includes a table specifying a minimum and maximum expected numbers of samples within the second spacing bit and within the second marking bit for each of a plurality of acceptable starting bytes for each of the predetermined acceptable baud rates.

* * * * *